Oct. 6, 1931.  W. S. BRUBAKER  1,825,776
FLOAT CONTROLLED VALVE
Filed Nov. 7, 1928
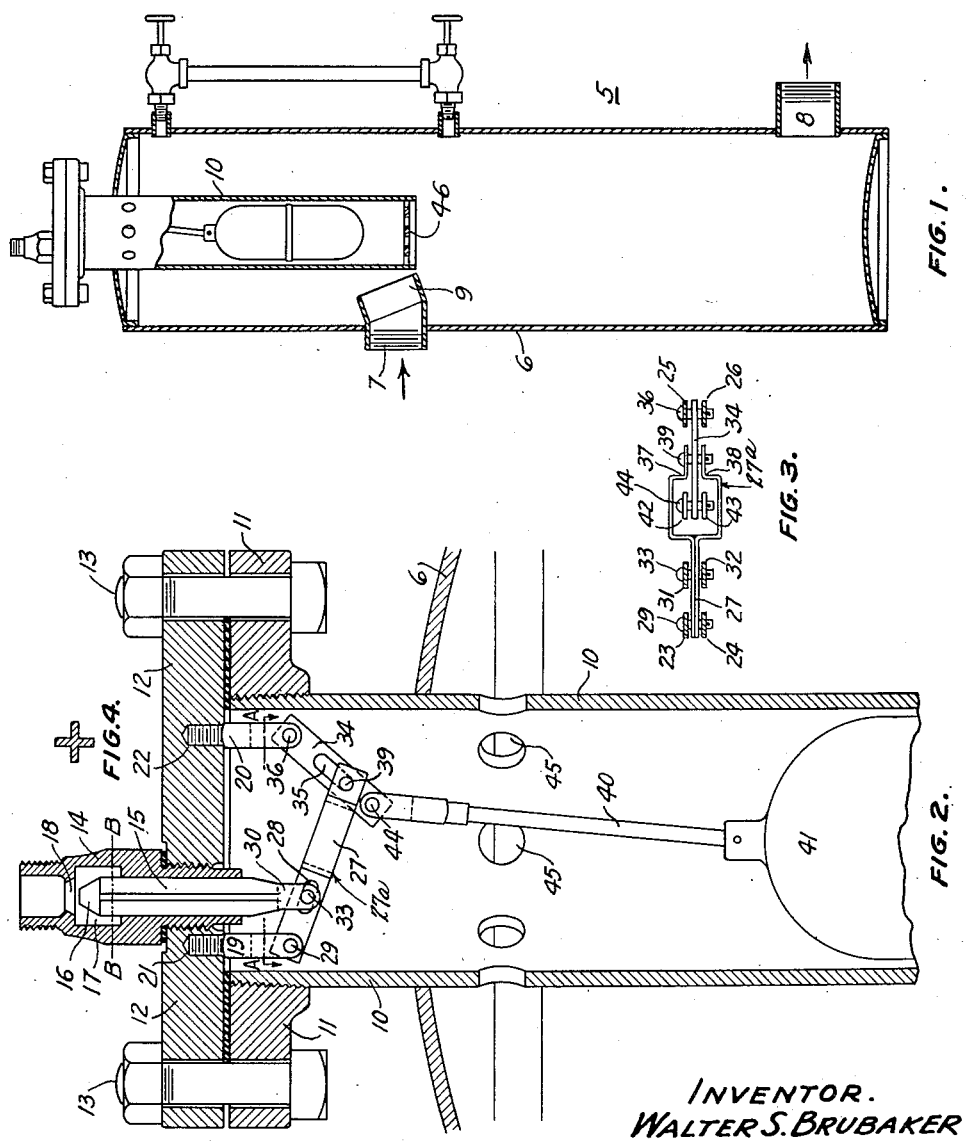
INVENTOR.
WALTER S. BRUBAKER
By. Eugene C. Gott, Jr.
Attorney.

Patented Oct. 6, 1931

1,825,776

UNITED STATES PATENT OFFICE

WALTER S. BRUBAKER, OF OAKLAND, CALIFORNIA, ASSIGNOR TO GRANBERG METER CORPORATION, OF SAN FRANCISCO, CALIFORNIA, A CORPORATION OF CALIFORNIA

FLOAT-CONTROLLED VALVE

Application filed November 7, 1928. Serial No. 317,797.

This invention relates to a separator for removing air and gas from liquids.

The separator is of a general type in which a float-controlled valve is provided at the upper end of the tank to allow escape of air or gas as liquid ascends in the tank, the valve closing upon predetermined rise of the liquid level. Such separators have wide and advantageous use in connection with displacement meters for measuring liquids, particularly gasoline and the like of volatile nature, for passage of air or gas through the meter will cause improper reading thereof and hence the separator is used to exhaust all air or gas from the liquid before passage of the latter through the meter.

It is the principal object of the present invention to provide a novel and advantageous float-controlled valve for the tank in which the air or gas is separated from the liquid.

The particular features of this invention which distinguish it from those of a similar character may be better understood by the following description with reference to the accompanying drawings in which it is illustrated and in which—

Figure 1 is the vertical section of the valve-equipped separator with a portion of the float guide broken away;

Figure 2 is the vertical section of the float guide and associated parts, showing the valve in detail;

Figure 3 is a view of the valve lever mechanism taken on the line A—A of Fig 2;

Figure 4 is the cross-section of the valve stem taken on the line B—B of Fig. 2.

In the drawings, numeral 5 represents the air separator which embodies a tank 6 having a diameter large enough to sufficiently slow up the rate of the flow of liquid so that the air or gas will separate properly, said tank having an inlet 7 and an outlet 8. The inlet 7 extends into the interior of the tank 6 and has an end portion pointed upwardly so that the incoming fluid is directed toward the surface of the liquid in the tank, thereby materially aiding in the escape of the air or gas contained in the fluid. In the top of the tank 6 a tubular float guide 10 is inserted which extends both interiorly and exteriorly of the tank. The exterior portion of the float guide is threaded to receive a flange member 11 to which a removable cover 12 may be secured by the bolts 13.

A valve casing 14 is screwed into the cover 12 and extends below the bottom of the cover. This valve casing 14 allows the air within the separator to escape and acts as a guide for the valve stem 15 of the valve 16. The valve casing 14 also provides a valve chamber 17 in which a conical valve seat 18 is reamed and upon which the valve 16 is moved to close the opening and prevent the escape of liquid from the tank 6.

Two posts 19 and 20 are each threaded at one end and screwed into the cover 12 at 21 and 22, respectively, while their lower ends terminate in forked portions having legs 23, 24 and 25, 26, respectively, as shown in Figure 3. The forked inclined lever 27 having a slot 28 between its ends is permanently connected at its upper end to the post 19 by the pin 29 and is pivotally and slidably connected to the forked portion 30 of the stem 15, by a pin 33 passing through the slot 28, said portion 30 having legs 31 and 32, straddling the lever 27.

The inclined lever 34 having a slot 35 therein is pivotally connected to the post 20 by the pin 36 and is connected pivotally and slidably to the legs 37 and 38 of the lever 27, by a pin passing through said legs and through the slot 35. The float rod 40, pivotally supporting the float 41 and having legs 42 and 43, is pivoted to the lower end of the lever 34 by the pin 44.

Lever 27 is provided with a yoke-like portion 27ª into which the upper end of rod 40 and the lower end of lever 34, are movable when the float 41 ascends to effect valve closing.

In operation the float 41 hangs down and by its own weight keeps the valve 16 open, while the air or vapor is separated and escapes through the holes 45 in the float guide, and passes out through the valve casing 14. If the liquid level rises to a height sufficient to move the float upward, the valve will be gradually closed as the level of the liquid continues to rise until the float forces the valve shut to prevent the liquid from overflowing through the top. When the valve is closed, there will be air trapped at the top of tank 6 and the volume of this air will increase from the air or vapor separated from the liquid flowing through the tank until such time as the increasing volume of air will displace the liquid and lower the level in the tank. When the level of the liquid recedes the float will naturally move downward pulling the valve open and allowing the air to escape.

It will be seen from the foregoing that a valve construction has been provided which is simple and inexpensive, may therefore be manufactured and marketed at small cost, and will give efficient service with little danger of any parts becoming inoperative.

I claim:—

In a gas escape means, a horizontal support having a vertical gas escape passage, said passage being provided with a valve seat, a valve slidable in said passage and adapted for coaction with said seat, said valve projecting downwardly from said support, one post secured to and projecting downwardly from said support at one side of and relatively close to said valve, a second post secured to and projecting downwardly from said support at the other side of and comparatively distant from said valve, one lever fulcrumed at one of its ends to said one post and having a pin and slot connection with said valve, said lever having a yoke-like portion near its other end and being bifurcated from said yoke-like portion to said other end, a second lever fulcrumed at one of its ends to said second post, the intermediate portion of said second lever being straddled by and having a pin and slot connection with said bifurcated portion of said one lever, and a float connected with the other end of said second lever, a portion of the latter being adapted for reception in said yoke-like lever portion when the float ascends to effect valve closing.

WALTER S. BRUBAKER.